C. E. ALLEN.
Multiplying Scale Beam.

No. 231,516. Patented Aug. 24, 1880.

WITNESSES:
Henry N. Miller
C. Sedgwick

INVENTOR:
C. E. Allen
BY Munn & Co.
ATTORNEYS.

N. PETERS, PHOTO-LITHOGRAPHER, WASHINGTON, D. C.

UNITED STATES PATENT OFFICE.

CHARLES E. ALLEN, OF MANSFIELD, PENNSYLVANIA.

MULTIPLYING SCALE-BEAM.

SPECIFICATION forming part of Letters Patent No. 231,516, dated August 24, 1880.

Application filed January 12, 1880.

*To all whom it may concern:*

Be it known that I, CHARLIE E. ALLEN, of Mansfield, in the county of Tioga and State of Pennsylvania, have invented a new and useful Improvement in Multiplying Devices, of which the following is a specification.

The object of my invention is to furnish an apparatus for use in connection with a scale, or applied to a scale-beam, for the purpose of multiplying the weight, as indicated by the position of the poise, by any desired figure of a fixed gage, and indicating the result in figures.

My invention consists in a slideway, preferably the scale-beam of a weighing apparatus, a sliding poise, and an arm pivoted upon the scale-beam so that it may be moved at a more or less inclination to the path of the poise. The beam is fitted with a scale for adjusting the position of the arm according to required multiplier, and the result is indicated at the point where the poise and arm cross by a properly-arranged scale on the poise.

The construction and operation will be more particularly described with reference to the accompanying drawings, wherein—

Figure 1:
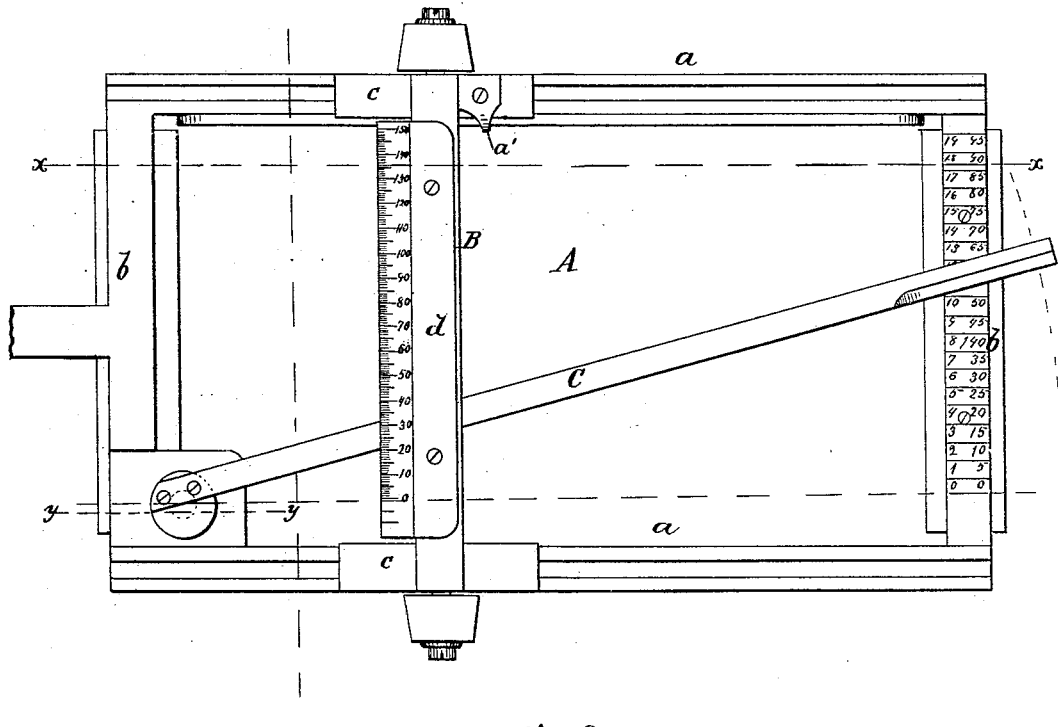
Figure 2:
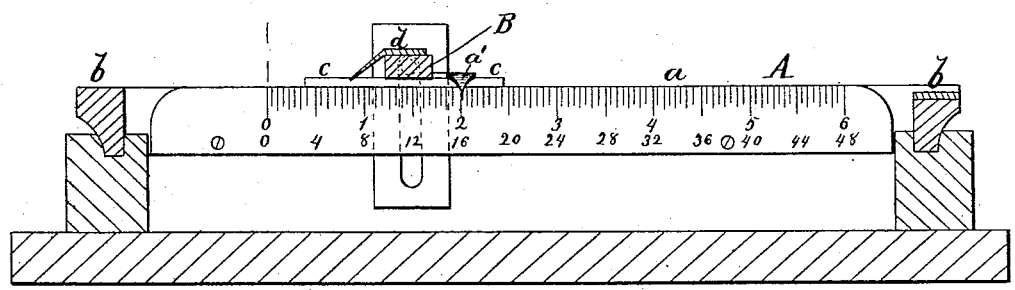
Figure 3:
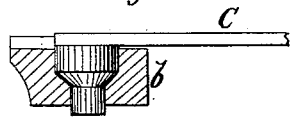

Figure 1 is a plan view of a scale-beam having my invention applied thereto. Fig. 2 is a sectional elevation on line *x x* of Fig. 1. Fig. 3 is a detail section on line *y y* of Fig. 1.

Similar letters of reference indicate corresponding parts.

The side bars, *a a*, and end bars, *b b*, of metal, form a rectangular frame, A, or scale-beam, that may be separate from the weighing apparatus, or not, as desired.

The slide-blocks *c* of the poise B are fitted to slide on the side bars, *a*, and are connected by a cross-bar, *d*.

The frame A is provided with a scale, as shown, in figures graduated to indicate the movement of the poise, which scale indicates the pounds or other units of weight or measure and fractions thereof.

The outer cross-bar, *b*, is provided on its upper surface with a scale having consecutive numbers from 1 upward, with fractions, if desired, and upon the poise B is a third scale, also showing consecutive numbers that are multiples of the figures of the two other scales.

Upon the frame A is pivoted an arm, C, that rests upon the outer cross-bar, *b*, so as to slide thereon to a position more or less at an inclination to the direction in which the poise B moves.

The pivotal center of the arm C is upon a line drawn through the zero-points of the scale on the poise B and the scale on cross-bar *b*, and upon back or in front of a line drawn at right angles through the zero-point of the scale on frame A, according to the position of the pointer *a'* of the poise. If the units of the scale on frame A are arranged one inch apart and the units of the scale on bar *b* one-fifth of an inch apart, the units of the scale on the poise will be one-fifth divided by the number of inches of arm C from the pivotal center to the indicating-line of *b*, which, if it is eight inches, will make the units of the poise-scale forty to an inch. Thus the edge of the arm C, placed on any graduation of bar *b*, will intersect the proper graduation of the poise in any position to which the poise is moved. Thus, for example, if the poise indicates two pounds on the scale-beam and arm C is placed at ten on bar *b*, the price per pound, the multiple of ten and two, is shown at the angle of arm C and poise B.

The scale on the poise may be magnified by any suitable connections to prevent confusion, and the poise B may be on the scale-beam itself, or on a separate beam, and moved by connections from the poise of the weighing-beam.

In practice the scales will be arranged to indicate fractions, so that the result may be obtained in any position of the poise.

This apparatus furnishes a simple means for quick and accurate computation in connection with weighing apparatus, and may be used separately, if desired.

Having thus described my invention, I claim as new and desire to secure by Letters Patent—

1. The multiplying apparatus consisting of the frame or scale-beam A, sliding poise B, provided with a graduated scale, pivoted arm C, fitted to move on arm A, and a graduated scale on beam A, by which the arm C can be set, combined for use in the manner substantially as shown and described.

2. The combination, with a scale-beam and its sliding poise, of the swinging arm C, pivoted at or near the zero-point of the scale-beam, and the graduated scales arranged to indicate the position of the poise and arm with relation to each other and the zero-point, substantially as and for the purposes set forth.

3. The combination, with the scale-beam of a weighing apparatus, of a mechanical device for indicating multiples of the weight, consisting of an arm pivoted to swing in a plane at right angles to the movement of the poise and scales for setting the arm and indicating the result, substantially as shown and described.

CHARLIE ELMER ALLEN.

Witnesses:
L. F. ALLEN,
M. A. CASS.